United States Patent

[11] 3,581,709

| [72] | Inventors | Robert L. Van Huis<br>Route #2;<br>Willis R. Voran, 1701 104th Street; Edwin W. Faber, 225 Park Street, all of Zeeland, Mich. 49464 |
|---|---|---|
| [21] | Appl. No. | 759,430 |
| [22] | Filed | Sept. 12, 1968 |
| [45] | Patented | June 1, 1971 |

[54] CONFINEMENT CAGES FOR TURKEYS
5 Claims, 3 Drawing Figs.

| [52] | U.S. Cl. | 119/24, 119/48 |
|---|---|---|
| [51] | Int. Cl. | A01k 31/00 |
| [50] | Field of Search | 119/17, 18, 21, 22, 24, 25, 48 |

[56] References Cited
UNITED STATES PATENTS

| 1,127,712 | 2/1915 | Wrenn | 119/21 |
| 2,082,132 | 6/1937 | Wright | 119/21 |
| 2,264,959 | 12/1941 | Sperry et al. | 119/24X |
| 2,300,573 | 11/1942 | Ische | 119/22 |

*Primary Examiner*—Hugh R. Chamblee
*Attorney*—Price, Heneveld, Huizenga and Cooper

ABSTRACT: A confinement cage construction having a mesh floor, with a roost member extending lengthwise of the cage and disposed centrally of and positioned atop such floor. A second member disposed beneath the floor is oriented in vertical alignment with the roost member and is secured to the same through the mesh floor, with the floor interposed therebetween. Support standards engage the lower such member to provide at least part of the vertical support for the cage enclosure.

PATENTED JUN 1 1971       3,581,709

INVENTORS
ROBERT L. VAN HUIS
WILLIS A. VORAN
EDWIN W. FABER
BY
Price, Heneveld
Huizinga & Cooper
ATTORNEYS

CONFINEMENT CAGES FOR TURKEYS

BACKGROUND

In recent years, the raising of chickens in confinement cages has rapidly grown in favor and popularity, and has become the predominant method of raising chickens in large or even relatively sizeable installations. For the most part, the cages used for this purpose are elongated enclosures including a top, sides, and a floor, all made of a relatively stiff wire mesh material, normally with mesh openings on the order of one by two inches.

Confinement cages of this type have also been used to a certain extent in the raising of turkeys; however, results in this area have been less successful than in connection with chickens, inasmuch as the turkeys do not seem to adjust or become conditioned to a caged existence as well as do chickens. One reason for this is believed to reside in the floor arrangement of the cages. In cages used for chickens, the open-mesh floors are a planar panel which inclines uninterruptedly downward from the rear side to the front, where egg outlet openings are located. Living with their feet constantly resting upon this mesh floor does not appear to significantly hamper or interfere with the growth and living habits of chickens.

In connection with turkeys, however, a different situation is presented. Turkeys appear to take a relatively long time to become conditioned to cage life, and probably as a result of their greater weight pressing their feet downwardly against the cage floors with greater force, most turkeys in relatively short time become what is commonly known as "bumble footed", i.e., their feet become crippled and develop numerous lumps and other similar deformities. While the open-mesh floors in the cages are normally blamed for this rather serious problem, floors of this type really are a necessity in order for the cages to be self-cleaning, that is, in order for droppings, feathers, meat and shell from broken eggs, etc., to fall downwardly through the bottom of the cage and into appropriate pits located therebeneath. Consequently, the plight of the turkeys and the difficulties of conditioning them to cage life has been a continuing and troublesome difficulty which heretofore has gravely threatened the prospect of more widespread usage of cage installations for this species of bird.

SUMMARY

According to the present invention, a cage construction is provided which is particularly well suited for turkeys, and particularly for mature turkeys in the egg-laying circle of their lives, which thoroughly overcomes the difficulties of previous turkey cages which resulted in the crippling and deforming of the feet of the birds housed therein, while nonetheless retaining the benefits of the confinement cage principle.

Briefly stated, the cage construction of the present invention incorporates a mesh floor having a solid wooden or like roost member running transversely thereof, extending completely across the cage from one side to the other, and mutually spaced between the front and rear walls thereof. Preferably, this roost member is positioned slightly above the cage floor. Also, it is preferably secured through the mesh cage floor to a companion support member located immediately therebeneath, with the cage floor disposed between the support member and the roost member. The cage enclosure is supported, at least in part, by spaced members extending beneath the cage enclosure and engaging the aforementioned support member from the bottom.

DRAWINGS

PREFERRED EMBODIMENT

Figure 1:
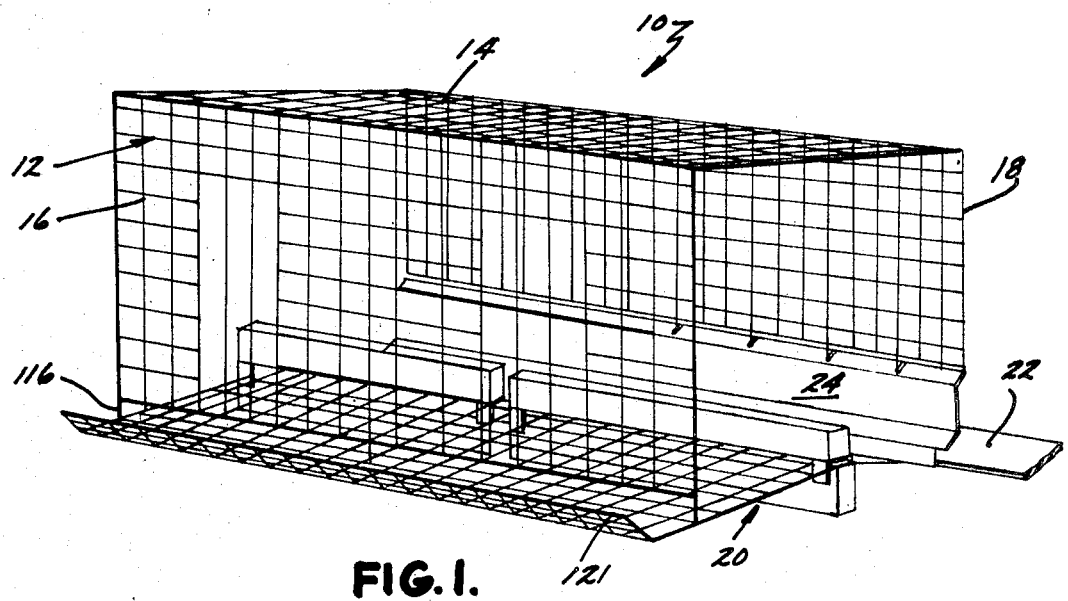
FIG. 1 is a fragmentary frontal perspective view showing the cage installation of the invention.

Referring now in more detail to the drawings, the cage construction or assembly 10 seen in FIG. 1 incorporates at least one cage enclosure 12 of wire mesh material, preferably comprised of relatively stiff metal rod stock welded or otherwise secured together at points of mutual intersection, having a top 14, a front (or outer) wall 16, a rear (or inner) wall 18, and a floor 20. Preferably the assembly 10 is elongated in nature to provide a large number of individual cage enclosures 12, each separated from the next adjacent ones by sidewalls (not specifically shown).

As illustrated, the floor 20 is crowned, having the shape of a broad, inverted letter V, i.e., it inclines upwardly from both the front and rear walls 16 and 18 at a small angle toward the center of the cage enclosure; also, the side edge extremities of the floor 20 extend outwardly beyond the vertical planes in which the front and rear walls 16 and 18 are located, to thereby form jutting traylike portions which serve as receptacles for collecting the eggs laid within the cage enclosure. That is, eggs laid within the cage enclosure will roll downwardly along either the front or forward portion 120 of the floor 20, or else the rearward portion 220 thereof.

The lower extremity of the front wall 16 terminates somewhat above the front floor portion 120 (FIG. 1) and is connected thereto at spaced intervals by extended wire rods 116, which may be elements of which the front wall 16 itself is made. This forms open spaces beneath the bottom of wall 16 and that portion of the floor located therebelow, through which eggs laid upon front floor portion 120 will roll downwardly and out of the cage enclosure, onto the outwardly-extended floor extremity 121 forming an egg-collection tray.

On the opposite side of the cage enclosure, rear wall 18 also terminates above its respective floor portion 220, to provide egg-outlet openings; however, floor portion 220 extends outwardly beyond the plane of rear wall 18 to form a bed 221 for a belt 22 of jute fibers or the like comprising a movable conveyor member by which egg-collection is effected automatically. As illustrated, an egg-guard member 24 is preferably mounted against the rear wall 18 above the level of the floor portion 220 located therebeneath, with a lower portion of the egg guard extending inwardly from the rear wall over the opening at the base thereof through which eggs will roll onto the egg-collection conveyor belt 22.

As is well known in the art, such an egg guard will materially reduce egg breakage as a result of contact with the feet of the birds housed within the cage enclosure. In regard to the housing of mature, egg-laying turkeys within confinement cages, however, the egg guard 24 has a somewhat unexpected function, in that the turkeys are attracted to such a device and like to press against it when laying eggs, possibly for support, but for reasons whose true nature is presently not fully understood. As a consequence, the vast majority of the eggs laid within the cage enclosure 12 will be laid in that section thereof located above floor portion 220, on the side having the egg guard 24. However, a certain number of eggs is likely to be laid on the other part of the cage floor, and it is for this purpose that the egg-collection traylike extremity 121 is provided. Automated means need not, however, be provided within this extremity, since the limited number of eggs to be found therein at any given time is decidedly small in comparison to the opposite side of the cage.

The most significant portion of the present cage construction involves a roost element 30 which extends longitudinally of the cage assembly and transversely (i.e., from side to side) of each individual cage enclosure, directly above the floor 20, and approximately equally spaced between the front and rear walls 16 and 18. The roost element 30 is preferably a solid bar or rod, which may be of wood, advantageously provided by a piece of ordinary lumber mill dimension stock, such as a "two-by-two" inch board. This is positioned directly over the crowned center portion of the floor 20, as illustrated. Directly beneath the floor and in vertical alignment with the roost element 30 is a mounting or support member 32. Member 32 also extends longitudinally of the cage assembly 10, and, like the roost element 30, may effectively be comprised of a piece of dimension lumber, such as a "two-by-four" inch board.

Figure 3:
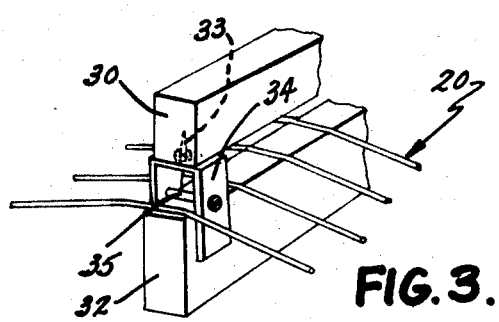
FIG. 3 is a fragmentary perspective view of the roost member showing the mounting thereof.

The roost element 30 is mounted atop the mounting member 32, preferably by a plurality of spaced U-shaped brackets 34 (FIG. 3) whose legs extend through the openwork floor 20. The web or central part of each such bracket is attached to the bottom of the roost element, as by screws 33 or the like, and the two downwardly extending legs of each bracket straddle the sides of mounting member 32, against which the bracket legs may be tightened by a bolt 35 passing through the two legs of each bracket. Actually, this bolt need not be tightened in order to firmly mount the roost element in place unless it is desired to locate the latter a particular desired distance above the mounting member 32, since so long as there is a reasonably close sliding fit of the bracket legs over the mounting member, the roost element cannot fall or be dislodged sideways from its place thereupon. Thus, in most instances the bolt 35 need not be tightened to clamp the legs of the bracket against the mounting member, but instead serves to prevent separation of the legs and to position the roost above the mounting member by physical contact with the latter.

In addition to supporting the roost element 30 in place above the floor of the cage enclosure, the mounting member 32 also forms part of a mounting means for vertically supporting the central portion of the cage enclosure, at points beneath the roost element. This mounting means comprises a desired number of suspension members 36 (FIG. 2), each having a crossbar portion 38 which extends transversely beneath the cage enclosure, and also having vertical leg portions 40 which depend downwardly from the crossbar to contact the floor. Preferably, the crossbar 38 and legs 40 are of right-angle metal stock. As will be understood, the crossbars 38 may also be suspended from overhead, if desired, thereby eliminating the need for the legs 40.

As illustrated, the suspension member 36 thus forms a vertical standard, and at approximately the midpoint of the crossbar portion 38, an upwardly extending somewhat U-shaped bedplate 42 is provided for engaging the underside of the mounting or support member 32, to thereby support the cage enclosure centrally upon the suspension standard 36. Also, the outboard ends of the member 32 each have an edge support member 44 disposed essentially beneath the walls 16 and 18, for supporting the cage enclosure along its sides in addition to the support at the center thereof.

Figure 2:
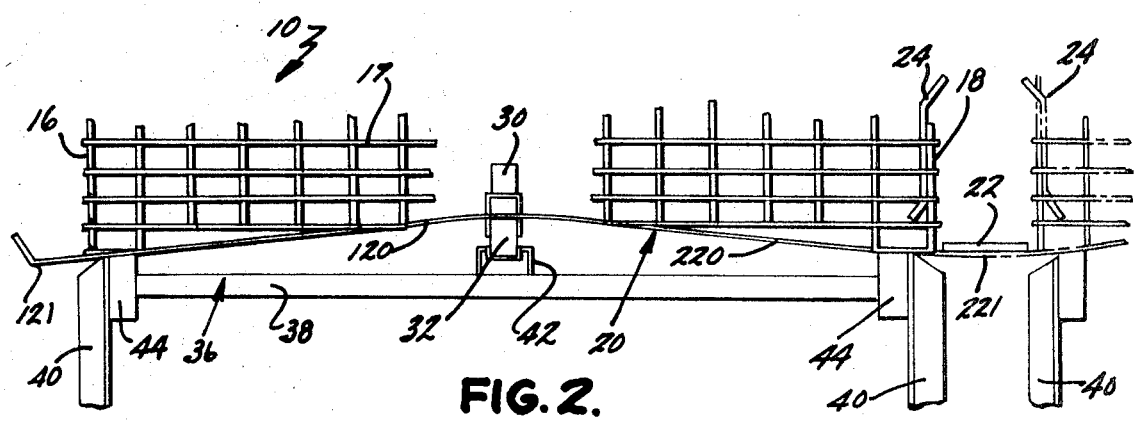
FIG. 2 is a fragmentary end elevation of the cage shown in FIG. 1.

As illustrated in FIG. 2, it is contemplated that the cage construction 10 will be installed in dual, side-by-side, spaced-apart relation, with the outward extension 221 of floor portion 220 secured to or integral with a like outward extension of a similar floor part of a spaced but adjacent cage assembly 10', as illustrated. In this manner, a belt-type conveyor member 22 rides between the adjacent pair of cage constructions, and with the egg guards 24 of each spaced apart and vertically flanking the space above the conveyor belt. As indicated in FIG. 2, the second cage assembly 10' may have its own independent suspension member or means 36 or, if desired, the entire suspension arrangement may comprise a single unitary such member.

By means of the present cage construction, the turkeys are afforded a roost along the central part of the cage floor which, generally speaking, is at the level of the floor and therefore very readily accessible to the birds, but which at the same time is elevated at least slightly above the surface of the floor and allows the birds to place all or a major portion of the bottoms of their feet upon the solid wooden roost element. This takes the weight of the bird off the wire mesh cage floor itself, thereby reducing to the point of substantial elimination the stress and strain placed on the bird's feet, soothing the birds and relaxing them by making them more comfortable. Further, the birds are known to prefer to roost at elevated, or relatively elevated positions with respect to their environment. The placement of the roost element at a position up the inclined floors, and preferably atop their crowned central point, serves this preference of the birds and further soothes them while roosting while at the same time tending to lead the birds to roost often by conforming to their most natural instincts.

In accordance with more-or-less conventional practice, the feeding and watering troughs for the cage assemblies illustrated may be located immediately outward of the rear or inner wall 18 thereof, above the egg guards 24 and between the spaced cages, where the installation utilizes the dual configuration shown in FIG. 2. This brings the birds to this wall in random movements, causing them to leave the roost 30 and walk upon the mesh floor 20 in order to eat and drink. Due to the aforementioned attraction which the birds have for the egg guard 24 at least during the intervals when they are laying eggs, this arrangement greatly conduces to the laying of eggs on the side of the cage adjacent the automatic egg-collection conveyor belt 22. As the bird's feet grow tired, the birds will once again gravitate toward the roost 30, where they will remain until rested or until hunger, thirst, or merely restlessness causes them to depart to walk about on the mesh floor.

The spacing of the roost element 30 at least slightly above the floor (and above the support 32) 12 definitely of importance in the raising of turkeys or other poultry in confinement cages. This eliminates narrow crevices or like interstices in which droppings and debris would otherwise accumulate to produce very unsanitary and unhealthy conditions. In accordance with the concept shown, any such condition is completely avoided and the cage-and-roost assembly is made to be as self-cleaning as possible. Further, the roost structures are exceedingly easy to install, either in existing or in newly manufactured equipment, and they may readily be removed or replaced whenever desired.

It is entirely conceivable that upon examining the foregoing disclosure, those skilled in the art may devise embodiments of the concept involved which differ somewhat from the preferred embodiment shown and described herein, or may make various changes in structural details to the particular embodiment shown. Consequently, it is to be recognized that the preferred embodiment shown and described is for purposes of general illustration only and is in no way intended to illustrate all possible forms of the invention.

The embodiments of the invention in which I claim an exclusive property or privilege are defined as follows:

1. A confinement cage construction for poultry, comprising in combination: cage wall portions defining a cage enclosure; said enclosure having an inclined floor member formed at least in part of openwork material; a poultry roost member mounted within said enclosure; said roost member having portions extending above said floor at a position at least partially up the incline thereof, for supporting the feet of a roosting bird off the floor member; and mounting means for vertically supporting portions of said cage enclosure at points beneath said roost element; said mounting means including at least one member located beneath said cage floor and generally in vertical alignment with said roost element, and structure extending through said openwork floor interconnecting said roost element and said mounting means member.

2. The cage construction of claim 1, wherein said mounting means further comprises a number of suspension members extending beneath said cage enclosure and engaging said mounting means member to vertically support both it and said portions of said cage.

3. The cage construction of claim 1, wherein said roost member is positioned at the highest rise point of said inclined floor.

4. The cage construction of claim 1, wherein said floor slopes upwardly from opposite ones of said wall portions to form a crown, and wherein said roost member is positioned at said crown.

5. A confinement cage for poultry, comprising in combination: cage wall portions defining a cage enclosure; said enclosure including means forming a floor which slopes upwardly from certain of said wall portions to define a raised crown; a roost means including a roost element positioned within said cage enclosure at said crown of said floor; said floor includes a support member disposed generally centrally beneath said crown; and means engageable with said support member for mounting said roost element in said position.